(12) United States Patent
Anderson

(10) Patent No.: US 6,594,941 B1
(45) Date of Patent: Jul. 22, 2003

(54) FISHING ROD HOLDER TIP-UP DEVICE

(75) Inventor: Arne Ray Anderson, Watertown, SD (US)

(73) Assignee: Clam Corporation, Plymouth, MN (US)

( * ) Notice: Subject to any disclaimer, the term of this patent is extended or adjusted under 35 U.S.C. 154(b) by 0 days.

(21) Appl. No.: 09/942,476

(22) Filed: Aug. 29, 2001

(51) Int. Cl.[7] ............................................. A01K 97/12
(52) U.S. Cl. ......................................................... 43/17
(58) Field of Search ............................ 43/17, 21.2, 15, 43/16; 42/94; 248/514, 518–520; D22/147

(56) References Cited

U.S. PATENT DOCUMENTS

| | | | | |
|---|---|---|---|---|
| 2,137,645 A | * | 11/1938 | Doench | 224/922 |
| 2,773,326 A | | 12/1956 | Calvert | 43/16 |
| 2,828,096 A | | 3/1958 | Beri | 248/40 |
| 3,060,616 A | | 10/1962 | Woodley | 43/17 |
| 3,724,791 A | * | 4/1973 | Mason | 248/514 |
| 3,824,730 A | | 7/1974 | Johnson | 43/17 |
| 3,956,846 A | * | 5/1976 | Kent | 248/538 |
| 4,159,816 A | | 7/1979 | Miyamae | 248/515 |
| 4,161,839 A | | 7/1979 | Ward | 43/17 |
| 4,373,287 A | | 2/1983 | Grahl | 43/17 |
| 4,479,322 A | * | 10/1984 | Koppel | 248/513 |
| 4,522,572 A | | 6/1985 | Hahn | 43/16 |
| 4,523,403 A | | 6/1985 | Ivy et al. | 43/17 |
| 5,050,332 A | * | 9/1991 | Cross | 43/15 |
| 5,088,224 A | * | 2/1992 | Gutierrez | 211/70.8 |
| 5,228,227 A | | 7/1993 | Hodgson, Sr. | 43/15 |
| 5,564,213 A | * | 10/1996 | Rinehart | 43/17 |
| 5,845,427 A | * | 12/1998 | Taylor | 42/94 |
| 5,896,694 A | * | 4/1999 | Midha | 43/17 |
| 5,987,801 A | | 11/1999 | Anderson | 43/17 |
| 5,992,081 A | * | 11/1999 | Elkins | 43/21.2 |
| 6,050,020 A | * | 4/2000 | Sizemore | 43/15 |

* cited by examiner

*Primary Examiner*—Charles T. Jordan
*Assistant Examiner*—Tara M Golba
(74) *Attorney, Agent, or Firm*—Curtis Harr

(57) ABSTRACT

A folding frame apparatus is provided that contains a removable and pivoting rod clamp employed to hold a ice fishing jig rod in the desired position, and is designed in a manner that it can be used with almost all of the ice fishing jig rods on the market today. The frame of the present invention is constructed in a manner that all joints are pivotal in nature which allows the frame to be opened or closed as desired by the user. The present invention is also equipped with a signal flag assembly which, when a fish takes the bait, causes the flag to move to an upright position and alerts the fisherman to the presence of a fish.

11 Claims, 7 Drawing Sheets

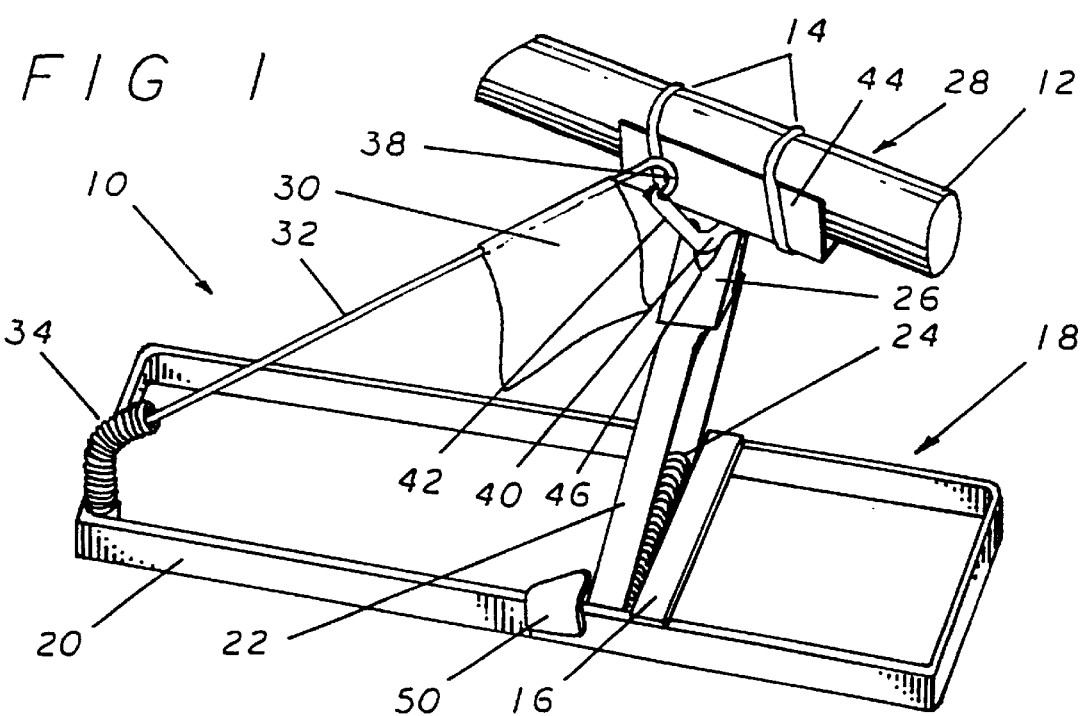
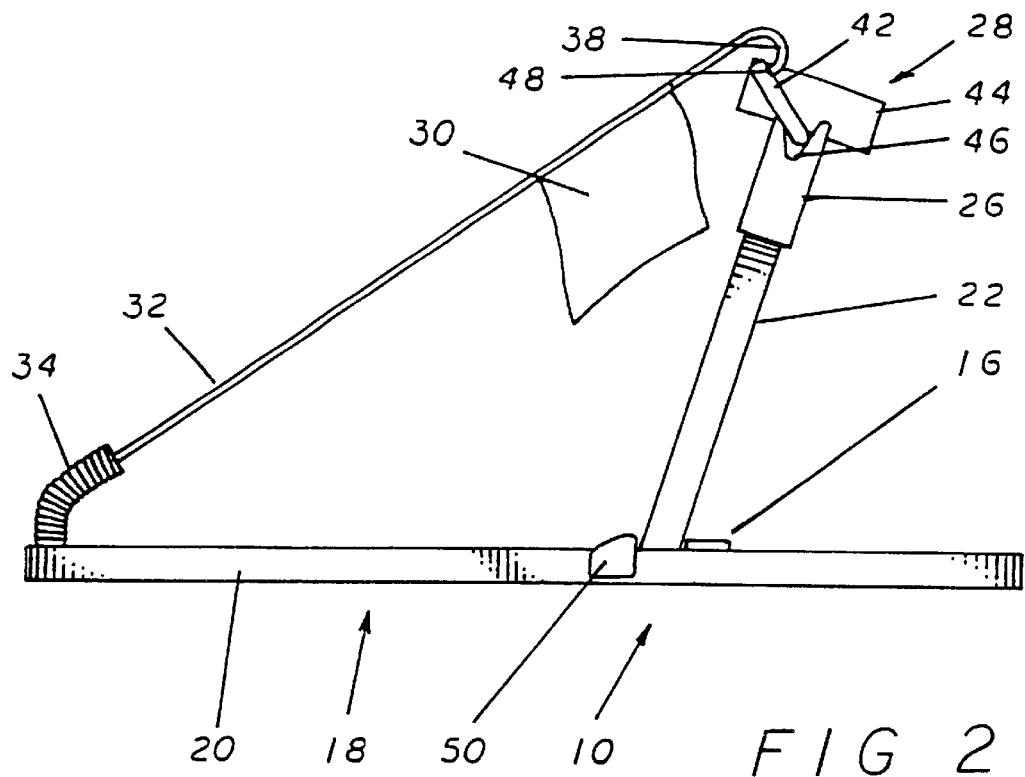

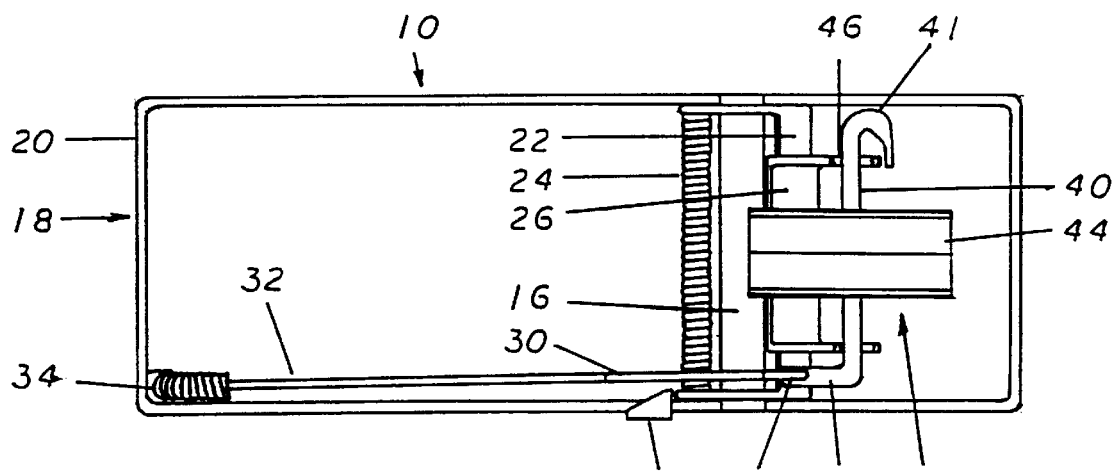
FIG 3
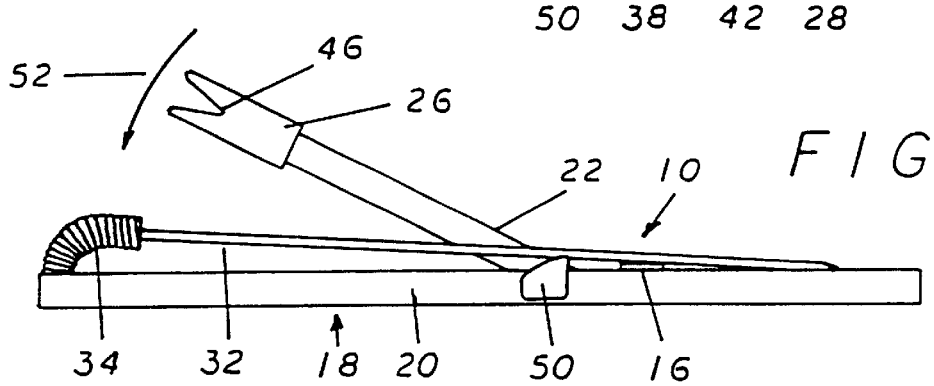
FIG 4
FIG 5

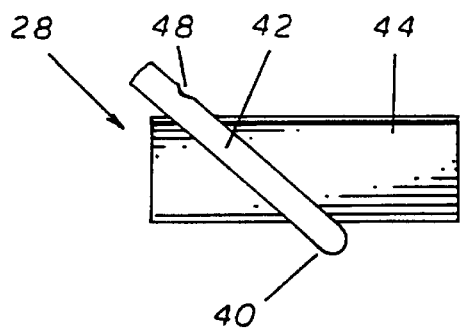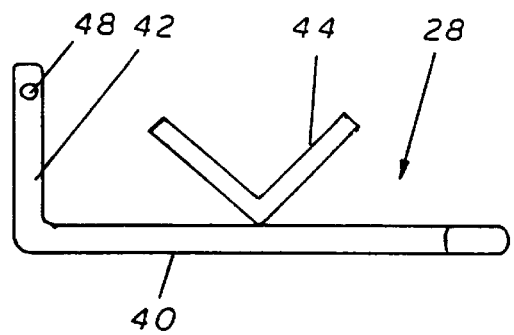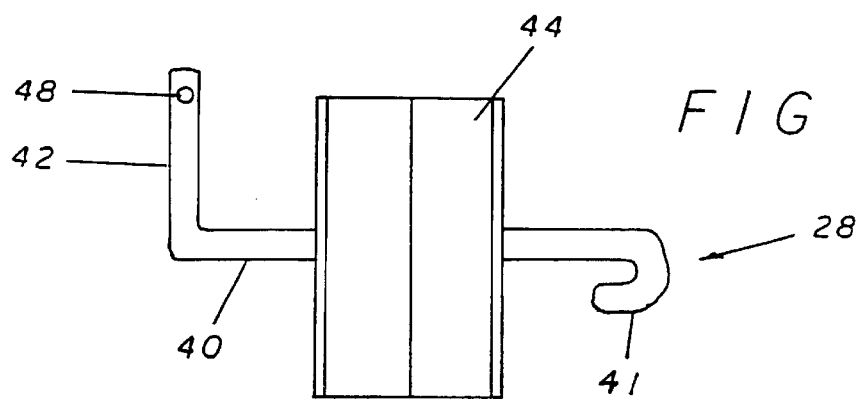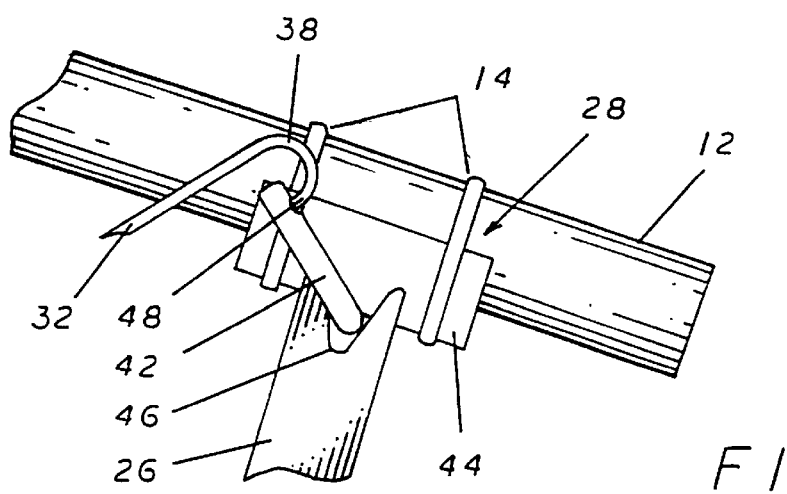

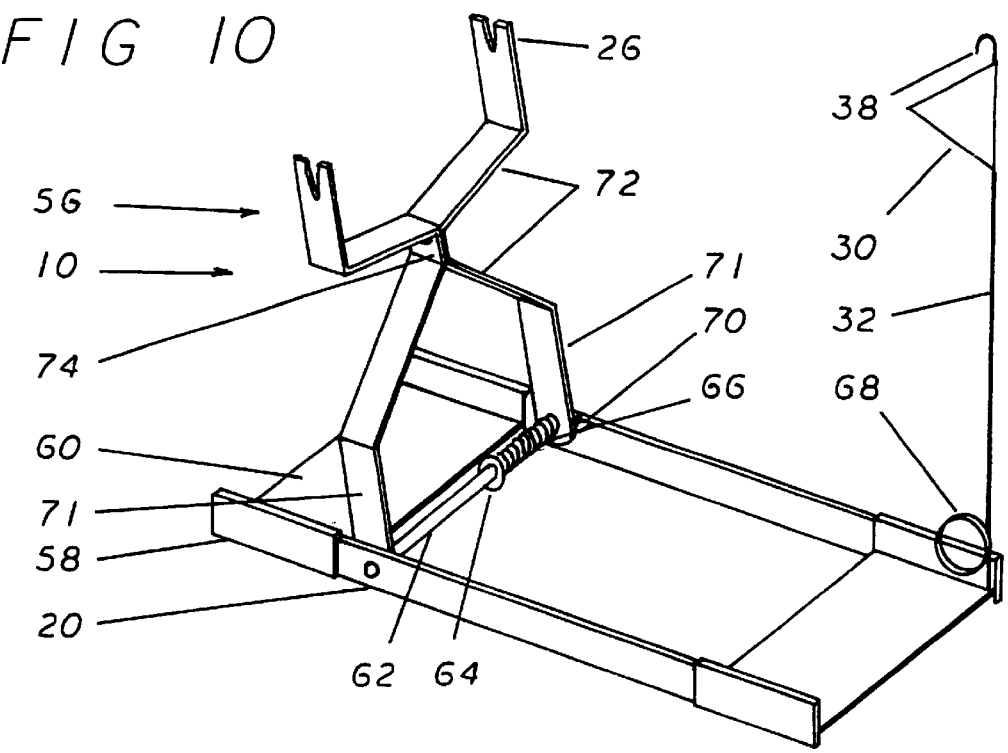
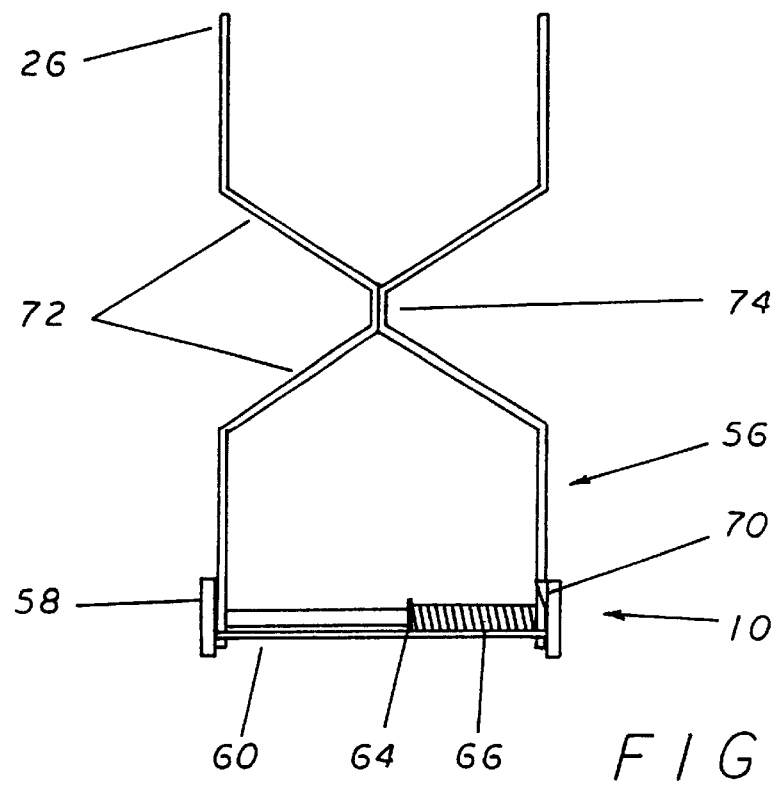

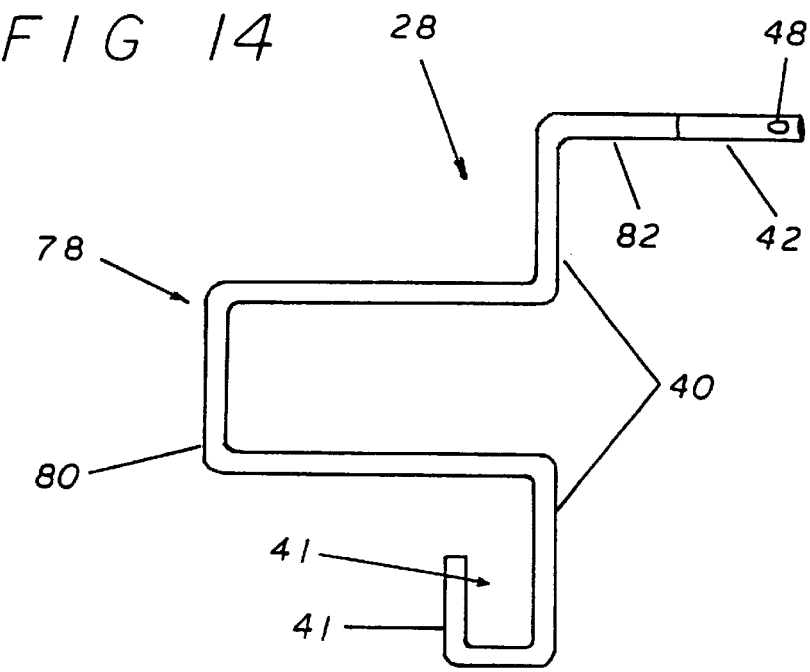
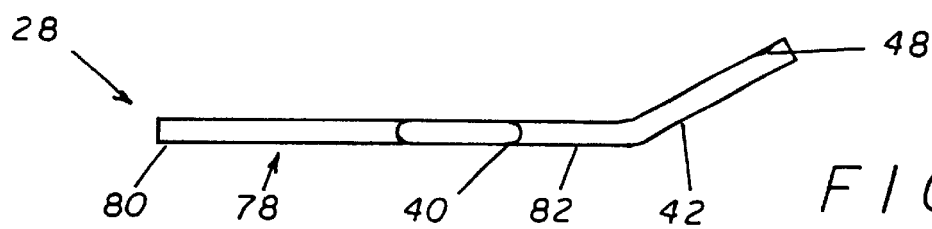
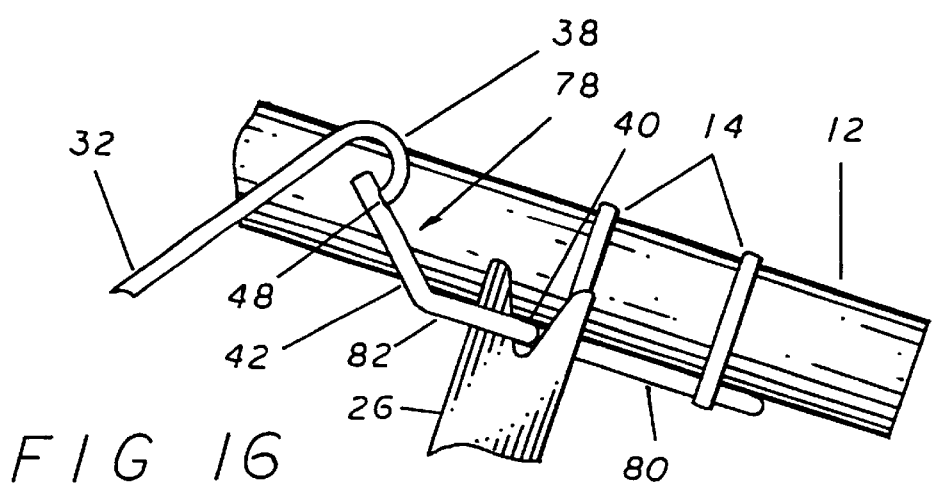

FISHING ROD HOLDER TIP-UP DEVICE

BACKGROUND OF THE INVENTION

The present invention relates to an improvement in an ice fishing tip-up. More specifically, a device for holding a commonly used ice fishing jigging rod in a collapsible bracket designed in a tip-up arrangement.

Jigging rods are commonly used in ice fishing when a sportsman fishes directly over an ice fishing hole, holding a rod while jigging a lure up and down through the hole in order to attract fish. An ice fisherman may have several jigging rods with him on a fishing trip supplied with varying line sizes, lures and rod and reel strengths. These rods may be used to varying degrees, depending on the type of fish being caught or desired.

Commonly, when ice fishing, an ice fisherman will fish out of a house or sheltered structure using a jigging rod in order to catch fish. Fisherman will also, at the same time, place holes drilled in the ice some distance away from the house, and supply these holes with what is known as tip-ups or unattended ice fishing devices. These devices will have some type of indicator that will signal the ice fisherman in the house when there has been a bite on that line. The reason for drilling holes far away from the house is so that an ice fisherman may fish for larger game fish away from the house, while jigging for smaller game fish within the house. This will result in larger game fish being away from the house, preventing them from scaring smaller game fish away. It may also be done to simply cover more area.

One of the problems with commonly used tip-up rods is that the device can be rather cumbersome or large, and not easily carried around by ice fisherman who like to remain rather mobile while fishing. A further problem with tip-up type rods is that they can be rather expensive and thus, it is not convenient to have a tip-up rod that utilizes varying degrees of line strength or setups.

From this, it follows that it would be desirable to supply tip-up apparatuses that can be used with common jigging rods and further hold a jigging rod in a tip-up fashion and thus, unattended with some sort of signaling device. This type of device could take advantage of fisherman's existing jigging rods.

Prior art fishing rigs of this type have existed for some time. U.S. Pat. No. 5,050,333 issued to Debreczeni discloses a fishing rig which uses a jigging type rod attached to a knock down base. The problem with this design is that the base and jigging rod must be designed to match, thus the base cannot be used with any commonly available jigging type rod as a special mounting system must be utilized.

Another such assembly is disclosed in U.S. Pat. No. 4,837,965 issued to True. This patent also utilizes a tip-up base for holding a jigging type rod, however the jig rod must be supplied with the proper attachment points to match the base. Thus, this system cannot be used with any commonly available jigging type rod.

U.S. Pat. No. 3,824,730 issued to Johnson discloses a base section having a rotatable bar through the middle made to match with a jigging rod. Although this patent somewhat solves the problem of connecting to commonly available jigging rods, the apparatus or connection point to the jigging rod limits its use with all jigging rods. Further, the base is not very portable as it is a one piece base which is designed in a non-foldable or non-collapsible structure.

From this discussion, it can be seen that it would be desirable to provide a collapsible tip-up frame that can be used with most commonly available ice fishing jig rods, and further to have the tip-up base supplied with some type of signaling means in order to allow a fisherman to determine when a bite has occurred on a given line.

SUMMARY OF THE INVENTION

It is the primary objective of the present invention to provide a fishing implement that is light in weight, easy to disassemble and fold into a compact package, and which can be quickly packed away for transport or long term storage purposes.

It is a further object of the present invention to provide such an implement that provides an accurate method of signaling when a fish has taken the offered bait which enables the user to set the hook in a timely and effective manner and maximizes his fishing efficiency.

It is a still further objective of the present invention to provide such a means that is easy and inexpensive to manufacture and which can be used with readily available ice fishing jigging rods.

These objectives are accomplished by the use of a folding frame apparatus that contains a removable and pivoting rod housing assembly that is used to hold an ice fishing rod in the desired position. The frame of the present invention is constructed in a manner so that the vertical rod support which is employed to hold the fishing rod in an elevated position is pivotally mounted to the base which allows the invention to be opened to the deployed position or closed to the stored position as desired by the user. The transformation from the deployed to the stored position is accomplished by the user compressing the lower end of the vertical rod support and the associated spring so the vertical support can be rotated by the support retainer located on the frame base. This allows the vertical rod support to be rotated down until it is parallel to the sides of the frame base. Conversely, to deploy the vertical rod support one simply rotates it up past the support retainer where it will snap into the appropriate position.

The present invention is also equipped with a signal flag assembly which consists of a flag, rod, and spring assembly. During the rod set-up in which the ice fishing rod is attached to the invention, the flag rod is attached to the pivoting rod housing assembly at the flag tab in a manner which pulls the tip of the rod down towards the base which loads the flag spring. When a fish takes the offered bait, the rod moves which in turn causes the pivoting rod housing assembly to move releasing the flag rod and signal flag. The load on the flag spring is then released causing the flag to abruptly move to an upright position alerting the fisherman to the presence of a fish on the end of his line.

The pivoting rod housing assembly of the present invention is designed in a manner so that it can be used with almost all of the ice fishing rods on the market today. This is accomplished by several variations including the use of an attachment apparatus consisting of a section of angle iron oriented with the open V pointed upward. This provides a point where the tubular handle of most ice fishing rods can be fixedly attached to secure it to the invention. This greatly increases the flexibility of the present invention as it can be used with a sportsman's present inventory of fishing gear and does not require the additional expense of specifically designed jigging rods.

The pivoting rod housing assembly is further supplied with a pivotal restrictor bar section. This section is basically a U-shaped portion extending outward from the rod housing assembly. This U-shaped section or pivotal restrictor bar works in conjunction with the rod support receiver to limit the amount of tilt or movement that the rod housing assembly may span. Thus, the travel of the rod housing assembly in an arc or rotating fashion is restricted at both it's upward and downward point of travel by this pivotal restrictor bar as it comes into contact with the rod support receiver.

An alternative method of construction for the present invention is the use of a vertical rod clamp support that is built in an X-shaped configuration having an area of confluence at the center. The use of this X-shaped configuration stiffens the clamp support which adds a degree of stability to the mounting of a fishing apparatus to the invention and resists any twisting of the clamp support when any torque is placed on the rod support receiver during fishing operations. The added strength of this construction method not only increases the usefulness of the invention, but also makes it more durable for a longer useful life.

Additionally, an alternative method of constructing the rod housing assembly is also provided which employs a U-shaped rod housing assembly that is entirely constructed of a single piece of heavy gauge wire. This method of construction not only produces a rod housing assembly that is inexpensively produced, but also one that works effectively with the remaining components of the present invention in its intended purpose of pivotally holding a fishing rod in the correct position with respect to the remainder of the invention.

For a better understanding of the present invention, reference should be made to the drawings in which there is illustrated and described preferred embodiments of the present invention.

DESCRIPTION OF THE DRAWINGS

FIG. 1 is a perspective view of the present invention showing the manner in which it is used in conjunction with a typical ice fishing rod and the way it is set to indicate when a fish has taken the bait.

FIG. 2 is a side elevation view of the present invention showing the method of construction and the manner in which the signal flag is set prior to its use in conjunction with an ice fishing rod.

FIG. 3 is a top elevation view of the present invention showing the orientation of its major components when it is set up for use with a typical fishing rod.

FIG. 4 is a side elevation view of the present invention showing the manner in which the frame is folded down for storage or transport.

FIG. 5 is a top elevation view of the present invention showing the orientation of the frame's major components in relation to one another when it is folded down for storage or transport.

FIG. 6 is a side elevation view of the pivoting rod housing assembly of the present invention showing its method of construction and the orientation of the flag tab in relation to the rod housing.

FIG. 7 is a front elevation view of the pivoting rod housing assembly component of the present invention showing its method of construction and the orientation of the rod housing in relation to the flag rod.

FIG. 8 is a top elevation view of the pivoting rod housing assembly component of the present invention showing its method of construction and the orientation of the rod housing and the general configuration of the flag rod.

FIG. 9 is a side elevation view of the pivoting rod housing assembly component of the present invention detailing the method used to connect it with the remaining components of the invention and the manner by which a typical fishing rod is attached through the use of tie downs.

FIG. 10 is a perspective view of an alternative embodiment of the present invention which employs the use of a cross braced vertical rod clamp support which adds a measure of rigidity and strength to the construction of the invention.

FIG. 11 is a front elevation view of the alternative embodiment of the present invention and details the use of the cross braced vertical rod clamp support and the manner in which it is constructed.

FIG. 14 is a top elevation view of an alternative embodiment of the rod housing assembly component of the present invention which employs the use of a single piece of formed heavy gauge wire to form a U-shaped rod housing assembly used to pivotally hold a fishing rod in proper place on the body off the present invention.

FIG. 15 is a side elevation view of an alternative embodiment of the rod housing assembly component of the present invention illustrating the manner of construction of the U-shaped rod housing assembly.

FIG. 16 is a side elevation view of the U-shaped rod housing assembly illustrating the manner in which it is employed with the other components of the present invention to hold a fishing rod in the proper orientation.

DESCRIPTION OF THE PREFERRED EMBODIMENT

Figure 12:
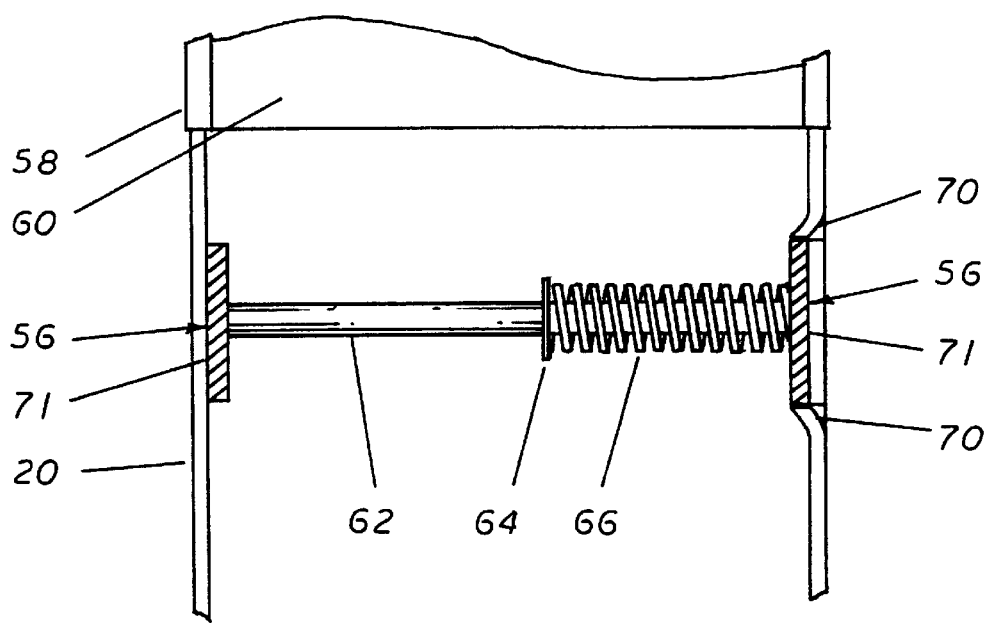
FIG. 12 is a top elevation cross sectional view of the support spring component of the alternative embodiment of the present invention illustrating its general manner of construction.

Referring now to the drawings, and more specifically to FIGS. 1, 2, and 3, the ice fishing rod holder and tip-up 10 consists primarily of a pivoting rod housing assembly 28 and a holder frame 18. The pivoting rod housing assembly 28 is the portion of the present invention which is used to hold the fishing rod handle 12 in place while the user is fishing. The attachment of the fishing rod handle 12 to the pivoting rod housing assembly 28 is accomplished by placing the fishing rod handle 12 within the rod housing 44 where it is held in place by the use of a plurality of rod handle tie downs 14. While attaching the fishing rod handle 12 to the rod housing 44, the user positions it in terms of the entirety of the invention so that it is properly balanced which enables the pivoting rod housing assembly 28 to operate effectively. These features ensure that the fishing rod handle 12 will be held securely within the invention and in the desired position while still remaining sensitive enough so that it will not interfere with the natural motion of the fishing rod when a fish takes the offered bait.

The holder frame 18 of the present invention is made up of a frame base 20 that is rectangular in shape and which sits flat upon any surface that the user is fishing from. This rectangular configuration provides stabilization for the invention as a whole, but it also is the platform upon which the remaining components of the present invention are built.

Extending diagonally upward at a slight angle from the frame base 20 is the vertical rod support 22 which is a U-shaped apparatus having its open ends pivotally attached to the inner surfaces of the frame base 20. The vertical rod support 22 provides at its upper most end the point of attachment for the rod support receiver 26 which in turn provides the point of attachment for the pivoting rod housing assembly 28 and for the pivotal restrictor bar 41 which contacts on the vertical rod support 22 so as to limit the pivotal nature of the pivoting rod housing assembly 28. Between the pivotal points of attachment of the open ends of the vertical rod support 22 is placed the support spring 24 which provides outward pressure at this point which is of importance to a feature of the invention that will be discussed in further detail in conjunction with other FIGURES below.

The present invention is also equipped with a signaling apparatus which alerts a fisherman to the presence of a fish on th end of his line. This apparatus is made up of a signal flag 30 which is attached towards the upper end of the flag rod 32. The flag rod 32 is attached at its lower most end to the flag spring 34 which is attached to the most forward left corner of the frame base 20. Additionally, the attachment of the flag rod 32 to the flag spring 34 is accomplished in a manner that allows its relative position within the flag spring 34 to be varied along the length of the flag spring 34. This method of construction allows the user to vary the load placed on the flag spring 34 which can alter performance characteristics of the mechanism as a whole.

The flag spring 34 functions to provide flexibility to the signal flag 30 and the flag rod 32 when it is desirable to place a load on it, but also to seek a vertical orientation when unimpeded. When the present invention is in use, the tip of the flag rod hook 38 located at the most upward end of the flag rod 32 is engaged to the upper most end of the flag tab 42 which is a component of the pivoting rod housing assembly 28. This positioning of the flag rod hook 38 serves to load the flag spring 34 by holding the flag rod in a diagonal position. Therefore, if the top of the flag rod 32 is released from the pivoting rod housing assembly 28, the load on the flag spring 34 will force the flag rod 32, and therefore the signal flag 30, to abruptly seek a vertical position and up warn the fisherman of the presence of a fish on his line. Therefore, if the top of the flag rod 32 is released from the pivoting rod housing assembly 28, the load on the flag spring 34 will force the flag rod 32, and therefore the signal flag 30, to abruptly seek a vertical position and up warn the fisherman of the presence of a fish on his line.

The folding or collapsing function of the present invention is illustrated by FIGS. 4 and 5. The frame base 20 is the primary structural component of the invention and its open center is the area into which the other components are folded. To accomplish the folding process, the pivoting rod housing assembly 28 must first be removed from the receiver notches 46 located at the most upward end of the rod support receiver 26. After the removal, the pivoting rod housing assembly 28 can then be stored in a convenient location for use with the present invention in the future.

Each open end of the vertical rod support 22 is pivotally attached at its lowermost end to the frame base 20. This method of attachment allows the vertical rod support 22 to fold within the edges of the frame base 20 inside the central open area once it has cleared the rod support retainer 50. This rotational rod support movement 52 is illustrated by the directional arrow specifically referenced in FIG. 4. The rod support retainer 50 is simply a fixedly attached piece of material that extends from the upper edge of the frame base 20 slightly into the central opening of the frame base and which is located just in front of the position of the lower portion of one or both sides of the vertical rod support 22. Additionally, the rod support retainer 50 is generally shaped having a diagonally angled forward surface in relation to the open position of the vertical rod support 22 and a perpendicularly oriented rearward surface in relation to the open vertical rod support 22. The purpose of the perpendicular surface of the rod support retainer 50 is to lock the vertical rod support 22 in the open position ensuring that the invention will not inadvertently fold up during use. Conversely, the diagonal forward surface allows the vertical support rod 22 to be opened up from the folded position by guiding the lower ends of the vertical rod support 22 past the most inward point of the rod support retainer 50. Additionally, the rod support retainer 50 works in conjunction with the support spring 24 as the support spring 24 tends to force the lower ends of the vertical rod support 22 outward against the inner surfaces of the frame base 20. This outward pressure operates to ensure that the vertical rod support 22 remains engaged with the rod support retainer 50 until such time as the operator decides to disengage them.

The folding motion of the present invention is accomplished by the user grasping the lower ends of each side of the vertical rod support 22 and squeezing them together. The lateral rod support movement 54 is illustrated by the directional arrow specifically referenced in FIG. 5. The squeezing of the lower portions of the vertical rod support 22 compresses the support spring 24 and allows the edges of the vertical rod support 22 to rotationally clear the inwardly protruding tip of the rod support retainer 50. After accomplishing this, the user then simply rotates the vertical support rod downward into the stored position within the frame base 20. Once the present invention is entirely folded, the signal flag 30 and the flag rod 32 can be positioned out of the way by attaching the upper end of the flag rod 32 to the inner surface of the frame base 20 by a plurality of means. By the described means the present invention is capable of being folded into a flat and compact configuration which facilitates its ease in transport and storage. Conversely, the opening of the invention for its designed use is accomplished simply by reversing the above described processes.

The construction and manner of operation of the pivoting rod housing assembly 28 are detailed by FIGS. 6, 7, 8, and 9. The pivoting rod housing assembly 28 is made up of a rod housing 44 which is a relatively short length angle iron which is generally one half of square-shaped metallic square and positioned within the pivoting rod housing assembly 28 as having its open end oriented in an upward manner. This open upward orientation allows for the easy attachment of a fishing rod handle 12 by laying it in a longitudinal manner within the opening. The fishing rod handle 12 is then held in place within the rod housing 44 by the use of a plurality of rod handle tie downs 14 which encircle the upper portion of the fishing rod handle 12 and the outer surface of the rod housing 44. This method of attachment secures the fishing rod handle 12 to the pivoting rod housing assembly 28. It is important at this stage that the user ensures that the fishing rod handle 12 is placed within the rod housing 44 in a position relative to the length of the fishing rod handle 12 so as to provide the proper balance to the invention as a whole.

Once this attachment has been accomplished, combined assembly of the fishing rod handle 12 and the pivoting rod housing assembly 28 is inserted into the receiving notches 46 of the rod support receiver 26. The insertion of the pivoting rod housing assembly 28 into the receiver notches 46 of the rod support receiver 26 is accomplished by the use of the housing bar 40 which is a perpendicularly oriented structure in relation to the rod housing 44 and which spans the gap between the arms of the rod support receiver 26. The housing bar 40 then sits within the lower portions of the receiver notches 46 allowing the entire body of the pivoting rod housing assembly 28 and the fishing rod handle 12 to pivot freely which is pivotal to the proper operation of the present invention.

The housing bar also contains the flag tab 42 which is a perpendicular extension of the housing bar 40 which extends diagonally upward and which also contains at its most forward and upward end the hook notch 48 which is the component of the invention used to hold the flag rod 32 in the loaded position during the use of the invention. The hook notch 48 is employed by placing the tip of the flag rod hook 38 component of the flag rod 32 into the depression in the flag tab 42 created by the hook notch 48. The tendency of the flag rod 32 (due to the operation of the flag spring 34) to seek an upright orientation places enough friction on this point of connection to relatively lightly hold the flag rod 32 in the loaded position. Therefore, when downward pressure is applied by the presence of a fish causing downward movement of the forward end of the pivoting rod housing assembly 28, the connection between the flag tab 42 and the flag rod hook 38 is interrupted which releases the energy stored in the loaded flag rod 32. The resulting movement causes the signal flag 30 to move abruptly to an upright position which alerts the fisherman to the presence of a fish on the end of his fishing line.

An alternative embodiment of the present invention is illustrated in FIGS. 10, 11, 12, and 13, which shows the ice fishing rod holder and tip up 10 as configured with a cross braced clamp support 56 which is detailed in FIGS. 10 and 11. The use of the cross braced clamp support 56 adds rigidity to the clamp support apparatus which resists torque forces placed on the upper portion of the device and imparts a higher degree of stability to the fishing process. The cross braced clamp support 56 is formed by diverting inward the vertical support bars 71 which make up the frame of the cross braced clamp support 56 from their vertical orientation to form the diagonal support bars 72 at roughly the center of the cross braced clamp support 56. The diagonal support bars 72 from each side of the cross braced clamp support 56 meet at the support bar confluence 74 where they are bound together before diverging again in an opposite manner to return to form the vertically oriented rod support receivers 26. This manner of construction forms the X-shape of the cross braced clamp support 56 which adds anti torsional strength to the invention.

An additional feature of this embodiment of the present invention that also enhances its overall stability is the use of a plurality of base pads 58 located on the corners of the frame base 20. The base pads 58 provides a stable platform upon which the entirety of the invention rests during use. Additionally, the base pads 58 are connected in pairs laterally across the width of the frame base 20 at its front and rear portions by the pad cross members 60. The pad cross members 60 replace the end members of the frame brace 20 and are also wider which adds additional stiffness to the frame base 20 of the invention and enhances its use as a fishing base.

The manner in which the base of the cross braced clamp support 56 is spring loaded for purposes of locking it in an upright position is further detailed in these FIGURES as well as in FIG. 12. This portion of this embodiment of the present invention employs a support cross bar 62 that spans the width of the frame base 20 between either side of the base of the cross braced clamp support 56. The support cross bar 62 serves as the point of attachment for the short support spring 66 which is used to place outward force on one of the vertical support bars 71 which forces it in a space between the two retainer tabs 70 located on the corresponding surface of the frame base 20. The short support spring 66 is positioned laterally on the support cross bar 62 by the use of the spring stop 64 which positions the short support spring 66 between itself and the inner surface of the pertinent vertical support bar 71 and which also compresses the short support spring 66 to place the desired load on the vertical support bar 71.

This method of construction forces the vertical support bar 71 into a locked position between the retainer tabs 70 which enables the cross braced clamp support 56 to remain in the desired position in relation to the frame base 20 by its interaction with the retainer tabs 70. This positioning can be overcome by the deflection of the pertinent vertical support bar 71 to a position where its travel is no longer impaired by the presence of the retainer tabs 70. Once this has been accomplished, the cross braced clamp support 56 can be pivoted in the same fashion as the previous embodiment to fold it into a relatively flat and compact orientation for long term storage or transport purposes.

Figure 13:
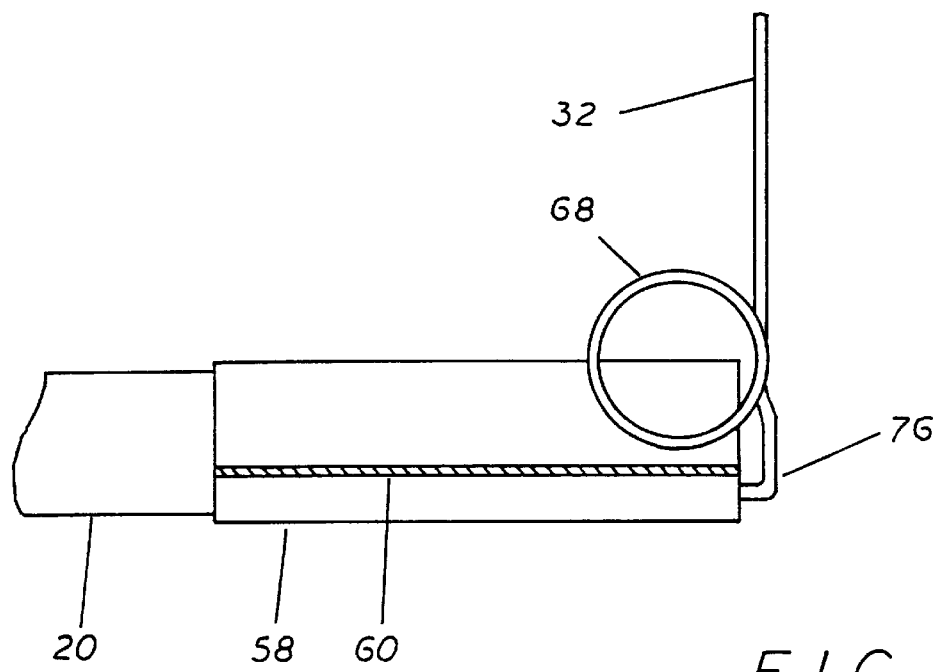
FIG. 13 is a side elevation view of the flag spring component of the alternative embodiment of the present invention illustrating its general manner of construction.

Additionally, this embodiment of the present invention also employs an alternative method of attaching and articulating the flag rod 32 and its attached signal flag 30 which is further detailed in FIG. 13. This embodiment uses a circular flag spring 68 which is attached to the frame base 20 of the invention at the forward portion of the base pad 58 just below the pad cross member 60 by the use of the flag spring support 76. The use of the circular flag spring 68 simplifies the construction of the invention which results in a effective yet more inexpensive product being available on the market to the end user of the present invention.

Finally, an additional method of manufacturing the rod housing assembly 28 is illustrated in FIGS. 14, 15, and 16, which details a construction method for this component of the present invention which uses a single piece of heavy gauge wire to form a U-shaped rod housing assembly 78. This method of manufacture not only performs the duties of the previous rod housing assembly 28 in a more than as adequate manner, but does so in a manner which is more cost effective both in materials and production than the previous method. This results in a finished product that is less expensive and therefore more readily accessible to the fishing public.

The U-shaped rod housing assembly 78 shares many of the same components as the previous embodiment such as the housing bar 40 which allows for the pivotal engagement of the rod support receiver 26 and the flag tab 42 used to provide the place of connection for the flag rod 32 at the hook notch 48 which is a depression in the flag tab 42 into which the flag rod hook 38 attaches to hold the flag rod 32 in the loaded position. All these components function with the U-shaped rod housing assembly 78 in the same fashion as with the previous design of the rod housing assembly 28.

The U-shaped rod housing assembly 78 differs from the previous designs of the rod housing assembly 28 in the manner of construction of the U-shaped bar 80 which is the portion of the U-shaped rod housing assembly 78 onto which the fishing rod handle 12 is attached and the flag tab support 82 which extends the flag tab 42 out to the proper location. As with the previous design, the fishing rod handle 12 is fixed to the U-shaped bar 80 by the use of a plurality of rod handle tie downs 14 which are elastic bands that encircle both the U-shaped bar 80 and the fishing rod handle 12 to hold it securely. The use of this design allows the entire invention to be built less expensively while giving the same performance as the previous design. This enables the present invention to be produced at lower costs which can be passed on to the final users allowing a greater number of fishermen to benefit from its characteristics.

Figure 17:
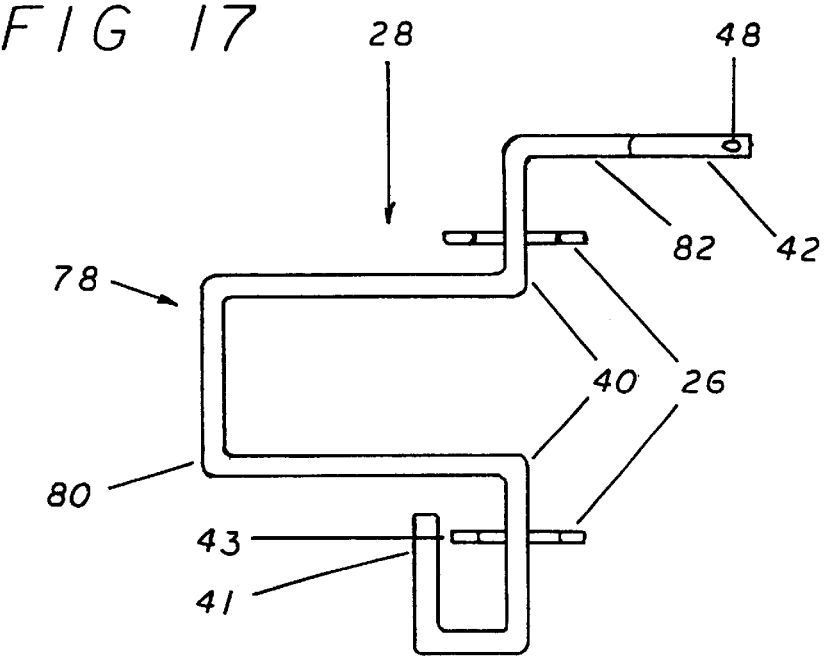
FIG. 17 is a top elevation view of an alternative embodiment of the rod housing assembly component of the present invention illustrating the manner in which it rests upon the rod support receiver.
Figure 18:
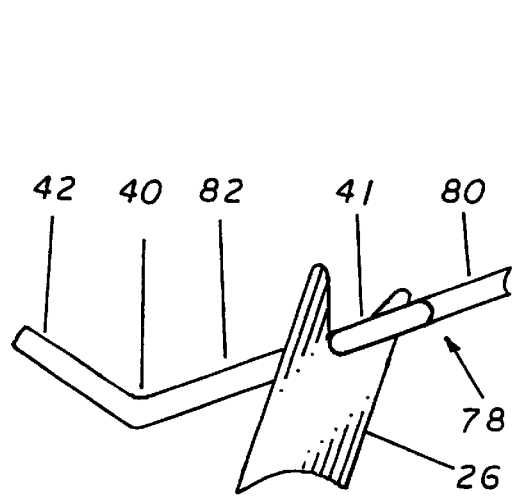
FIG. 18 is a side elevation view of the U-shaped rod housing assembly as illustrated in FIG. 17 detailing the manner in which the pivotal restrictor bar limits the forward movement of the U-shaped rod housing assembly in reference to the rod support receiver.
Figure 19:
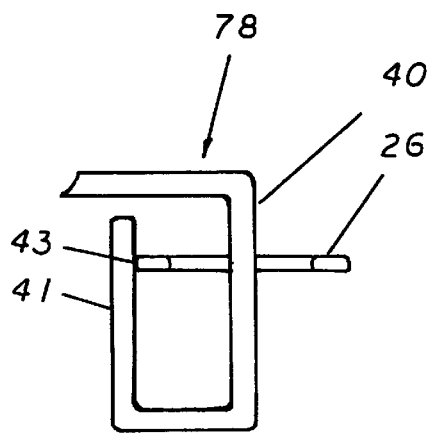
FIG. 19 is a top elevation view of the U-shaped rod housing assembly as illustrated in FIG. 17 detailing the manner in which the pivotal restrictor bar limits the forward movement of the U-shaped rod housing assembly in reference to the rod support receiver.

An additional feature of the U-shaped rod housing assembly 78 also native to the rod housing assembly 28 is the pivot restrictor bar 41 illustrating in FIGS. 17, 18 and 19. This pivotal restrictor bar 41 extends outward from the U-shaped bar 80 and wraps back in a rearward manner in relation to the overall orientation of the invention to enclose the upper portion of the rod support receiver 26. In its general configuration, this leaves a pivotal restrictor bar gap 43 between the inner surface of the pivotal restrictor bar 41 and the most rearward surface of the rod support receiver 26. This restrictor bar gap 43 allows the U-shaped rod housing assembly 78 to pivot within it's mounting on the rod support receiver to a certain degree. When this pivoting has reached a maximum extent in the upward and downward pivotal arc, the inner surface of the pivotal restrictor bar 41 contacts the most rearward surface of the rod support receiver 26 stopping the pivotal motion and acting as a upward and downward limit. This limiting action of the pivotal arc is further detailed in FIG. 19.

Although the present invention has been described in considerable detail, with reference to certain preferred versions thereof, other versions are possible. Therefore, the spirit and scope of the appended claims should not be limited to the description of the preferred versions contained herein.

What is claimed is:

1. A collapsible fishing rod holder tip-up for holding an ice fishing jigging rod and reel combination, said tip-up comprising:
   a base section;
   a vertical support section having a top and a bottom portion, with said bottom portion pivotally attached to said base section, so as to move pivotally between a position in parallel and substantially perpendicular with said base, said vertical support section further defining a first and second rod support receiver section;
   a rod housing assembly having a first side and a second side, said rod housing assembly being pivotally attachable to said first and second rod support receiver sections;
   an elongate bar forming said second side of said rod housing said elongate bar extending perpendicularly out from said second rod support receiver section and then bending back toward said second rod support receiver section and terminating prior to said second rod support receiver section so as to form a U shaped pivotal restrictor section.

2. A collapsible fishing rod holder tip-up as in claim 1 wherein said rod housing assembly further comprises a middle portion for attachment to said jigging rod.

3. A collapsible fishing rod holder tip-up as in claim 2 further comprising a flexible upwardly biased indicator flag having a lower end and an upper tip, with said lower end fixedly attached to said base section.

4. A collapsible fishing rod holder tip-up as in claim 3 wherein said first side of said rod housing assembly further comprises a flag tab section for connection to said upper tip of said indicator flag.

5. A collapsible fishing rod holder tip-up as in claim 4 further comprising a spring loaded base section locking mechanism for holding said vertical support section in a given position relative to said base.

6. A collapsible fishing rod holder tip-up as in claim 5, wherein said flag tab further comprises a notch for releasably holding said flag's upper tip.

7. A collapsible fishing rod holder tip-up and ice fishing jigging rod and reel combination comprising:
   a base section;
   a vertical support section having a top and a bottom portion, with said bottom portion pivotally attached to said base section, so as to move pivotally between a position in parallel and substantially perpendicular with said base, said vertical support section further defining a first and second rod support receiver section;
   a spring loaded base section locking mechanism attached to said vertical support section and said base section such that said vertical support section is biased in a position perpendicular to said base section;
   a rod housing assembly having a first side and a second side, said rod housing assembly being pivotally attachable to said first and second rod support receiver sections;
   a fishing rod attached to said rod housing assembly; and
   an elongate bar forming said second side of said rod housing, said elongate bar extending perpendicularly out from said second rod support receiver section and then bending back toward said second rod support receiver section and terminating prior to said second rod support receiver section so as to form a U shaped pivotal restrictor section to limit the pivot of said rod housing assembly and fishing rod relative to said base section.

8. A collapsible fishing rod holder tip-up and ice fishing jigging rod and reel combination as in claim 7 further comprising a flexible upwardly biased indicator flag having a lower end and an upper tip, with said lower end fixedly attached to said base section.

9. A collapsible fishing rod holder tip-up and ice fishing jigging rod and reel combination as in claim 8 wherein said first side of said rod housing assembly further comprises a flag tab section for connection to said upper tip of said indicator flag.

10. A collapsible fishing rod holder tip-up and ice fishing jigging rod and reel combination as in claim 9 further comprising a rod support retainer for locking said vertical support in an upward position relative to said base section.

11. A collapsible fishing rod holder tip-up and ice fishing jigging rod and reel combination as in claim 10 wherein said flag tab further comprises a notch for releasably holding said flag's upper tip.

* * * * *